United States Patent
Kim et al.

(10) Patent No.: US 11,485,856 B2
(45) Date of Patent: Nov. 1, 2022

(54) POLYOXYMETHYLENE POLYMER COMPOSITION THAT IS CHEMICAL RESISTANT

(71) Applicant: Ticona LLC, Florence, KY (US)

(72) Inventors: Sung Hye Kim, Cincinnati, OH (US); Rong Luo, Glen Allen, VA (US); Katrina Czenkusch, Elsmere, KY (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 15/971,454

(22) Filed: May 4, 2018

(65) Prior Publication Data

US 2018/0319980 A1    Nov. 8, 2018

Related U.S. Application Data

(60) Provisional application No. 62/599,373, filed on Dec. 15, 2017, provisional application No. 62/502,091, filed on May 5, 2017.

(51) Int. Cl.
| | |
|---|---|
| *C08L 71/02* | (2006.01) |
| *C08K 3/22* | (2006.01) |
| *B60K 15/01* | (2006.01) |
| *B60K 15/03* | (2006.01) |
| *B60R 13/04* | (2006.01) |

(52) U.S. Cl.
CPC .............. *C08L 71/02* (2013.01); *B60K 15/01* (2013.01); *B60K 15/03177* (2013.01); *B60K 2015/03493* (2013.01); *B60R 13/04* (2013.01); *B60Y 2410/122* (2013.01); *C08L 2205/025* (2013.01); *C08L 2205/035* (2013.01); *C08L 2205/24* (2013.01)

(58) Field of Classification Search
None
See application file for complete search history.

(56) References Cited

U.S. PATENT DOCUMENTS

| | | | | |
|---|---|---|---|---|
| 3,642,942 | A | * 2/1972 | Castner et al. | .......... C08G 2/30 524/151 |
| 4,675,356 | A | 6/1987 | Miyata | |
| 5,157,073 | A | 10/1992 | Kunz | |

(Continued)

FOREIGN PATENT DOCUMENTS

| | | |
|---|---|---|
| CN | 1569957 | 1/2005 |
| CN | 1730545 | 2/2006 |

(Continued)

OTHER PUBLICATIONS

English abstractorCN 103903608, Jul. 2, 2014, China, 8 pages.*

(Continued)

*Primary Examiner* — Tae H Yoon
(74) *Attorney, Agent, or Firm* — Dority & Manning, P.A.

(57) ABSTRACT

Polyoxymethylene polymer compositions and molded articles made from the composition are disclosed that are fuel resistant, particularly diesel fuel resistant, and resistant to highly acidic solutions. The polymer composition contains a polyoxymethylene polymer generally in an amount from about 90% to about 95% by weight. In addition, the polymer composition contains an add neutralizing agent and a plasticizer at a weight ratio that has been found to significantly improve the add resistant properties of the composition.

2 Claims, 3 Drawing Sheets

(56) References Cited

U.S. PATENT DOCUMENTS

| | | | |
|---|---|---|---|
| 6,489,388 B1 | 12/2002 | Kurz et al. | |
| 6,943,214 B2 | 9/2005 | Flexman | |
| 7,183,340 B2 * | 2/2007 | Harashina | C08K 5/3492 524/100 |
| 7,247,665 B1 | 7/2007 | Woerner et al. | |
| 7,261,989 B2 * | 8/2007 | Sugiura | G03G 9/0872 430/108.11 |
| 8,383,712 B2 * | 2/2013 | David | C08K 3/30 524/420 |
| 9,561,328 B2 | 2/2017 | Shang et al. | |
| 9,920,183 B2 * | 3/2018 | Shimoda | C08K 3/22 |
| 2004/0176508 A1 | 9/2004 | Notorgiacomo | |
| 2004/0242747 A1 * | 12/2004 | Nandi | C08K 3/26 524/425 |
| 2005/0020770 A1 | 1/2005 | Kim et al. | |
| 2005/0176835 A1 | 8/2005 | Kobayashi et al. | |
| 2007/0235693 A1 | 10/2007 | Price et al. | |
| 2007/0276070 A1 | 11/2007 | Kim et al. | |
| 2011/0313086 A1 | 12/2011 | Sharavanan et al. | |
| 2013/0284290 A1 | 10/2013 | Basista et al. | |
| 2014/0137975 A1 | 5/2014 | Klug et al. | |
| 2014/0179841 A1 * | 6/2014 | Bihari | C08K 5/0008 524/97 |
| 2014/0186562 A1 | 7/2014 | Klug et al. | |
| 2015/0175798 A1 | 6/2015 | Klug | |
| 2016/0251509 A1 | 9/2016 | Shimoda et al. | |
| 2018/0079893 A1 * | 3/2018 | Lin | C08K 13/02 |
| 2018/0319980 A1 | 11/2018 | Kim et al. | |

FOREIGN PATENT DOCUMENTS

| | | |
|---|---|---|
| CN | 1891753 | 1/2007 |
| CN | 101619155 | 1/2010 |
| CN | 102993624 | 3/2013 |
| CN | 103059501 | 4/2013 |
| CN | 103087460 | 5/2013 |
| CN | 103304955 | 9/2013 |
| CN | 103804847 | 5/2014 |
| CN | 104341709 | 2/2015 |
| CN | 104419111 | 3/2015 |
| CN | 104672778 | 6/2015 |
| CN | 107459760 | 12/2017 |
| DE | 102006050101 | 7/2007 |
| EP | 0957128 | 11/1999 |
| EP | 1674526 | 6/2006 |
| EP | 3162851 | 5/2017 |
| EP | 3081595 B1 * | 8/2017 |
| JP | H02279515 A | 11/1990 |
| JP | H05-222268 | 8/1993 |
| JP | H07-228751 | 8/1995 |
| JP | H08-231821 | 9/1996 |
| JP | H08-231822 | 9/1996 |
| JP | H09-235447 | 9/1997 |
| JP | H09-235448 | 9/1997 |
| JP | H09-278852 | 10/1997 |
| JP | H10-120746 | 5/1998 |
| JP | H11302497 A | 11/1999 |
| JP | 2000-017144 | 1/2000 |
| JP | 2001/011143 A | 1/2001 |
| JP | 2003 509521 | 3/2003 |
| JP | 2003-113289 | 4/2003 |
| JP | 2004-204172 | 7/2004 |
| JP | 2006-169310 | 6/2006 |
| JP | 2006-321880 | 11/2006 |
| JP | 2007-070375 | 3/2007 |
| JP | 2007-070574 | 3/2007 |
| JP | 2007-070575 | 3/2007 |
| JP | 2007-112959 | 5/2007 |
| JP | 2007-145979 | 6/2007 |
| JP | 2007-145980 | 6/2007 |
| JP | 2007-332227 | 12/2007 |
| JP | 2008-031348 | 2/2008 |
| JP | 2008-156489 | 7/2008 |
| JP | 2009-286874 | 12/2009 |
| JP | 2010-265438 | 11/2010 |
| JP | 2012-517516 | 8/2012 |
| JP | 2012-246337 | 12/2012 |
| JP | 2012237009 A | 12/2012 |
| JP | 2013-185027 | 9/2013 |
| JP | 2014-122298 | 7/2014 |
| JP | 2014-148625 | 8/2014 |
| JP | 2015504027 A | 2/2015 |
| JP | 2015-101599 | 6/2015 |
| JP | 2015-209474 | 11/2015 |
| JP | 2016-011398 | 1/2016 |
| JP | 2016 011398 | 1/2016 |
| JP | 2016-501963 | 1/2016 |
| JP | 2016069453 A | 5/2016 |
| JP | 2018 172456 | 11/2018 |
| JP | 6691171 | 4/2020 |
| WO | WO 99/05217 * | 4/1999 |
| WO | WO2004/058875 | 7/2004 |
| WO | WO2004/058884 | 7/2004 |
| WO | WO2005/033200 | 4/2005 |
| WO | WO2011/111823 | 9/2011 |

OTHER PUBLICATIONS

Kyowamag MF-150 by Kyowa Chemical Industry Co., LTD published on Oct. 1, 2015, 2 pages.*

PCT/US 18/31123, International Search Report and Written Opinion dated Jul. 23, 2018.

Product Information—HOSTAFORM ® C 13031 XF/POM/Specialty, Ticona Engineering Polymers, Jan. 2007, 4 pages.

Product Information—HOSTAFORM ® C 13031 XF/POM/Specialty, Ticona Performance Solutions, Oct. 2013, 4 pages.

Product Information—HOSTAFORM ® Polyoxymethylene Copolymer (POM), Ticona, Published Dec. 2006, 84 pages.

Liu, et al., Study on the Thermal Stability of POM/FE Powder Composites, Article, 38(3), 2010, pp. 60-62.

Supplementary European Report for EP 18795141.3, dated Sep. 16, 2020, 7 pages.

The JP Office Action dated Jun. 30, 2020 Corresponding to Application No. 2019-560684.

The Translation of the Japanese Office Action dated Apr. 15, 2021 Corresponding to Application No. 2019-560684.

Machine Translated Japanese Office Action Corresponding to Application No. 2019560684 dated Apr. 27, 2022.

* cited by examiner

POLYOXYMETHYLENE POLYMER COMPOSITION THAT IS CHEMICAL RESISTANT

RELATED APPLICATIONS

The present application is based upon and claims priority to U.S. Provisional Patent Application Ser. No. 62/502,091, having a filing date of May 5, 2017 and U.S. Provisional Patent Application Ser. No. 62/599,373, having a filing date of Dec. 15, 2017, both of which are incorporated herein by reference.

BACKGROUND

Polyacetal polymers, which are commonly referred to as polyoxymethylenes, have become established as exceptionally useful engineering materials in a variety of applications. Polyoxymethylene polymers, for instance, are widely used in constructing molded parts, such as parts for use in the automotive industry and the electrical industry. Polyoxymethylene polymers, for instance, have excellent mechanical property, fatigue resistance, abrasion resistance, chemical resistance, and moldability.

Because of their excellent mechanical properties, heat resistance and chemical resistance, polyoxymethylene polymers have been used in the past to produce components for various vehicles, such as cars and trucks. For example, because polyoxymethylene polymers do not significantly degrade when contacted with fuels, molded parts made from polyoxymethylene polymers have been used to produce fuel lines and other vehicle parts where the part is repeatedly contacted with vehicle fuels. In addition to being fuel resistant, the polyoxymethylene polymer compositions also have good impact resistance properties which makes molded parts made from the polymers resistant to damage or crack formation during normal wear and tear.

Particular problems, however, are faced when polyoxymethylene compositions are designed to contact diesel fuel. Diesel fuel, for instance, can contain sulfur or sulfur-containing compounds. When the diesel fuel is heated for prolong periods of time, the sulfur-containing compounds can oxidize and produce acidic sulfur compounds, which can decompose many different synthetic polymers, including having some effect on polyoxymethylene polymers. Thus, in the past, polyoxymethylene polymers have been combined with various different additives such as a hindered amine light stabilizer or a zinc oxide in order to make the polymer more resistant to contact with corrosive agents that may form from diesel fuel.

Recently, more and more cars and trucks are being made with decorative rims for the tires of the vehicle. In many instances, the decorative rims are made from a polished metal, chrome, or the like. In order to clean these materials, consumers and commercial car and truck washing establishments typically use a wheel cleaner that is highly acidic. For example, a wheel cleaner can have a pH below 3, and even below 2. Recently, it was discovered that wheel cleaners have been inadvertently sprayed onto components of the fuel system when being applied to the rims of the vehicle.

For instance, when the wheel cleaner is sprayed on the rim or on the tire, the highly acidic cleaner may penetrate through the wheel and remain on a fuel component. Highly acidic solutions, such as wheel cleaners, for instance, can cause rapid aging on parts made from polyoxymethylene polymers and, over time, cause damage to occur.

Thus, a need currently exists for a polyoxymethylene polymer composition that is not only fuel resistant, such as diesel fuel resistant, but is also resistant to highly acidic solutions, such as wheel cleaners.

SUMMARY

In general, the present disclosure is directed to a polymer composition containing primarily a polyoxymethylene polymer and to molded products made from the composition. The polymer composition of the present disclosure is particularly formulated to be fuel and acid resistant. More particularly, the polymer composition of the present disclosure and articles molded from the composition are well suited for contact with various fuels including diesel fuels and for contact with highly acidic liquids, such as various cleaning agents. Even after repeated contact with fuels and acidic solutions for extended periods of time, articles molded in accordance with the present disclosure do not degrade, crack or otherwise fail.

In one embodiment, for instance, the polymer composition of the present disclosure comprises a polyoxymethylene polymer in combination with an acid neutralizing agent and a plasticizer. More particularly, the composition not only contains the polyoxymethylene polymer in an amount greater than at least 60% by weight, but also contains an acid neutralizing agent and a plasticizer in a particular weight ratio that has been found to produce a polymer composition that is not only diesel fuel resistant but is also resistant to many highly acidic liquids, such as wheel and rim cleaners.

The polyoxymethylene polymer, for instance, may comprise a polyoxymethylene copolymer and may be present in the polymer composition in an amount greater than about 70% by weight, such as in an amount greater than about 80% by weight, such as in an amount greater than about 90% by weight. In one embodiment, the polyoxymethylene polymer is present in the polymer composition in an amount less than about 96% by weight, such as in an amount less than about 95% by weight. The polyoxymethylene polymer can have a melt flow index of greater than about 5 g/10 min, such as greater than about 9 g/10 min, such as greater than about 10 g/10 min, such as greater than about 12 g/10 min when measured according to ISO Test 1133 at 190° C. and at a load of 2.16 kg. The melt flow index is generally less than about 40 g/10 min, such as less than about 35 gill 0 min, such as less than about 30 g/10 min. In one embodiment, the melt flow index is from about 9 g/10 min to about 27 g/10 min.

As described above, the polyoxymethylene polymer is combined with an acid neutralizing agent and a plasticizer. The acid neutralizing agent can comprise an oxide, a sulfide or a carbonate. The oxide, for instance, may comprise a metal oxide, such as zinc oxide or magnesium oxide. Similarly, the sulfide may comprise a metal sulfide, such as zinc sulfide or magnesium sulfide. The carbonate may comprise calcium carbonate. The acid neutralizing agent can be present in the composition in an amount less than about 2% by weight, such as in an amount less than about 1.5% by weight, such as in an amount less than about 1.2% by weight.

Although the acid neutralizing agent can protect the polymer composition when exposed to diesel fuel and acidic components that may evolve from diesel fuel, the acid neutralizing agent can render the composition more brittle, especially after exposure to highly acidic solutions. In this regard, the acid neutralizing agent is combined with a plasticizer. The plasticizer, for instance, may comprise a polyalkylene glycol. The polyalkylene glycol, for instance, can have a mean molecular weight of greater than about 12,000, such as from about 25,000 to about 55,000. The plasticizer and the acid neutralizing agent are present in the polymer composition at a weight ratio of from about 3:1 to about 20:1, such as from about 3.5:1 to about 6:1, such as from about 3.5:1 to about 5.5:1. In one embodiment, the plasticizer comprises polyethylene glycol.

In other embodiments, the plasticizer may comprise an aromatic ester including aromatic polyesters, an aliphatic diester, an epoxide, a sulfonamide, a polyether, a polybutene, a polyamide, an acetylated monoglyceride, an alkyl citrate, or an organophosphate.

The plasticizer can be present in the composition in an amount greater than about 3% by weight, such as in an amount greater than about 3.5% by weight, such as in an amount greater than about 3.8% by weight. The plasticizer is generally present in an amount less than about 8% by weight, such as in an amount less than about 6% by weight.

Various other components can be present in the polymer composition to provide various benefits and advantages. In general, each of the other ingredients and components can be contained in the composition in an amount from about 0.1% by weight to about 10% by weight, such as from about 0.1% by weight to about 1% by weight.

In one embodiment, for instance, the polymer composition contains a copolyamide. The copolyamide may be present alone or in combination with an ethylene bis(stearamide).

In one embodiment, an acid scavenger may be present in the composition. The acid scavenger may comprise tricalcium citrate or calcium carbonate.

Another ingredient that can be present in the composition is a nucleating agent. The nucleating agent, for instance, may comprise a polyoxymethylene terpolymer.

As described above, the polymer composition is well suited for producing molded articles that are to contact fuel, such as diesel fuel. The polymer composition is also resistant to highly acidic solutions. In one embodiment, for instance, the polymer composition may be used to produce an exterior vehicle part. The molded article, for instance, may comprise a portion of the fuel system of a car or truck. In one embodiment, for example, the molded article may comprise a fuel contacting member. The fuel contacting member may comprise a fuel line or a fuel flange.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Repeat use of reference characters in the present specification and drawings is intended to represent the same or analogous features or elements of the present invention.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations.

In general, the present disclosure is directed to a polyoxymethylene polymer composition and to polymer articles made from the composition. The polymer composition contains a polyoxymethylene polymer and has improved fuel resistant properties, particularly diesel fuel resistant properties. In addition, the polymer composition of the present disclosure is also specially formulated to be resistant to highly acidic solutions. In particular, the polymer composition of the present disclosure is resistant to highly acidic cleaners that may come in contact with the fuel system of a car or truck. The highly acidic solution, for instance, may comprise a wheel cleaner, a rim cleaner, a chrome cleaner or the like. In the past, polyoxymethylene polymer compositions have been formulated so as to be diesel fuel resistant. Such formulations, however, may be susceptible to damage or degradation when contacted with a wheel or rim cleaner solution that is inadvertently contacted with parts or articles that make up the fuel system. In order to produce a polymer composition that is not only fuel resistant but resistant to highly acidic liquids, the composition contains a polyoxymethylene polymer combined with an acid neutralizing agent and a plasticizer at specific weight ratios that have been found to provide unexpectedly and dramatically better acid resistant properties. The acid neutralizing agent, in one embodiment, may comprise a metal oxide, while the plasticizer may comprise a polyalkylene glycol having a mean molecular weight of greater than about 8,000.

In general, any suitable polyoxymethylene polymer may be incorporated into the polymer composition.

The preparation of the polyoxymethylene polymer can be carried out by polymerization of polyoxymethylene-forming monomers, such as trioxane or a mixture of trioxane and a cyclic acetal such as dioxolane in the presence of a molecular weight regulator, such as a glycol. The polyoxymethylene polymer used in the polymer composition may comprise a homopolymer or a copolymer. According to one embodiment, the polyoxymethylene is a homo- or copolymer which comprises at least 50 mol. %, such as at least 75 mol. %, such as at least 90 mol. % and such as even at least 97 mol. % of —$CH_2O$-repeat units.

In one embodiment, a polyoxymethylene copolymer is used. The copolymer can contain from about 0.1 mol,% to about 20 mol. % and in particular from about 0.5 mol. % to about 10 mol. % of repeat units that comprise a saturated or ethylenically unsaturated alkylene group having at least 2 carbon atoms, or a cycloalkylene group, which has sulfur atoms or oxygen atoms in the chain and may include one or more substituents selected from the group consisting of alkyl cycloalkyl, aryl, aralkyl, heteroaryl, halogen or alkoxy. In one embodiment, a cyclic ether or acetal is used that can be introduced into the copolymer via a ring-opening reaction.

Preferred cyclic ethers or acetals are those of the formula:

in which x is 0 or 1 and $R^2$ is a $C_2$-$C_4$-alkylene group which, if appropriate, has one or more substituents which are $C_1$-$C_4$-alkyl groups, or are $C_1$-$C_4$-alkoxy groups, and/or are halogen atoms, preferably chlorine atoms. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers. It is particularly advantageous to use copolymers composed of from 99.5 to 95 mol. % of trioxane and of from 0.5 to 5 mol. %, such as from 0.5 to 4 mol. %, of one of the above-mentioned comonomers.

The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted.

In one embodiment, the polyoxymethylene polymer used in the polymer composition may contain a relatively high amount of reactive groups or functional groups in the terminal positions. The reactive groups, for instance, may comprise —OH or —$NH_2$ groups.

In one embodiment, the polyoxymethylene polymer can optionally have terminal hydroxyl groups, for example hydroxyethylene groups and/or hydroxyl side groups, in at least more than about 50% of all the terminal sites on the polymer. For instance, the polyoxymethylene polymer may have at least about 70%, such as at least about 80%, such as at least about 85% of its terminal groups be hydroxyl groups, based on the total number of terminal groups present. It should be understood that the total number of terminal groups present includes all side terminal groups.

In one embodiment, the polyoxymethylene polymer optionally has a content of terminal hydroxyl groups of at least 15 mmol/kg, such as at least 18 mmol/kg, such as at least 20 mmol/kg. In one embodiment, the terminal hydroxyl group content ranges from 18 to 50 mmol/kg. In an alternative embodiment, the polyoxymethylene polymer may contain terminal hydroxyl groups in an amount less than 100 mmol/kg, such as less than 50 mmol/kg, such as less than 20 mmol/kg, such as less than 18 mmol/kg, such as less than 15 mmol/kg. For instance, the polyoxymethylene polymer may contain terminal hydroxyl groups in an amount from about 5 mmol/kg to about 20 mmol/kg, such as from about 5 mmol/kg to about 15 mmol/kg. For example, a polyoxymethylene polymer may be used that has a lower terminal hydroxyl group content but has a higher melt volume flow rate.

In addition to or instead of the terminal hydroxyl groups, the polyoxymethylene polymer may also have other terminal groups usual for these polymers. Examples of these are alkoxy groups, formate groups, acetate groups or aldehyde groups. According to one embodiment, the polyoxymethylene is a homo- or copolymer which comprises at least 50 mol-%, such as at least 75 mol-%, such as at least 90 mol-% and such as even at least 95 mol-% of —$CH_2O$-repeat units.

In one embodiment, a polyoxymethylene polymer can be produced using a cationic polymerization process followed by solution hydrolysis to remove any unstable end groups. During cationic polymerization, a glycol, such as ethylene glycol or methylal can be used as a chain terminating agent. A heteropoly acid, triflic acid or a boron compound may be used as the catalyst.

The polyoxymethylene polymer can have any suitable molecular weight. The molecular weight of the polymer, for instance, can be from about 4,000 grams per mole to about 20,000 g/mol. In other embodiments, however, the molecular weight can be well above 20,000 g/mol, such as from about 20,000 g/mol to about 100,000 g/mol.

The polyoxymethylene polymer present in the composition can generally have a melt flow index (MFI) ranging from about 1 to about 50 g/10 min, such as from about 9 g/10 min to about 27 g/10 min as determined according to ISO Test 1133 at 190° C. and 2.16 kg, though polyoxymethylenes having a higher or lower melt flow index are also encompassed herein. In one embodiment, the polyoxymethylene polymer has a melt flow index of generally greater than about 10 g/10 min. For example, the polyoxymethylene polymer can have a melt flow index of greater than about 11 g/10 min, greater than about 12 g/10 min. The melt flow index of the polyoxymethylene polymer can be less than about 35 g/10 min, such as less than about 30 g/10 min, such as less than about 25 g/10 min, such as less than about 20 g/10 min, such as less than about 14 g/10 min.

Suitable commercially available polyoxymethylene polymers are available under the trade name Hostaform® (HF) by Celanese/Ticona.

The polyoxymethylene polymer may be present in the polyoxymethylene polymer composition in an amount of at least 60 wt. %, such as at least 70 wt %, such as at least 75 wt. %, such as at least 80 wt. %, such as at least 85 wt. %, such as at least 90 wt %, such as at least 93 wt. %. In general, the polyoxymethylene polymer is present in an amount of less than about 100 wt. %, such as less than about 97 wt. %, such as less than about 95 wt. %, wherein the weight is based on the total weight of the polyoxymethylene polymer composition.

According to the present disclosure, the polyoxymethylene polymer is combined with an acid neutralizing agent and a plasticizer in ratios that have been found to unexpectedly and dramatically improve the ability of the polymer composition and molded articles made therefrom to be resistant to highly acidic solutions. The acid neutralizing agent generally comprises a metal compound and/or an oxide, a sulfide or a carbonate. Metal oxides that may be used as the acid neutralizing agent include, for instance, magnesium oxide and/or zinc oxide. Sulfides that may be used include zinc sulfide, magnesium sulfide, silver sulfide, or molybdenum disulfide. In some examples, the neutralizing agent includes a calcium carbonate.

For example, in one embodiment, the acid neutralizing agent comprises a zinc oxide. The zinc oxide may be present in the polymer composition in the form of particles, such as precipitated particles.

In one embodiment, the zinc oxide particles have a relatively small range of particle size combined with a high surface area. For example, precipitated zinc oxide particles can have significantly higher surface area than zinc oxides made by other methods. The acid neutralizing agent of the present disclosure, for instance, can have a BET surface area of greater than about 25 $m^2$/g, such as greater than about 30 $m^2$/g, such as greater than about 35 $m^2$/g, such as greater than about 40 $m^2$/g, such as greater than about 45 $m^2$/g, such as greater than about 50 $m^2$/g, such as greater than about 55 $m^2$/g. The BET surface area is generally less than about 100 $m^2$/g. Using a zinc oxide or other acid neutralizing agent having a relatively high surface area allows for the material to be present in minimal amounts. Minimizing the amount of zinc oxide in relation to the plasticizer may improve the resistance of the polymer composition to wheel cleaner solutions.

In general, the acid neutralizing agent is present in the polymer composition in an amount less than about 10% by weight, such as less than about 5% by weight, such as in an amount less than about 4% by weight, such as in an amount less than about 3% by weight, such as in an amount less than about 2% by weight, Minimizing the amount of acid neutralizing agent present in the composition may be desired in certain applications. In this regard, in one embodiment, the acid neutralizing agent or zinc oxide may be present in the composition in an amount less than about 1.5% by weight, such as in an amount less than about 1.2% by weight, such as even in an amount less than about 1.1% by weight. The acid neutralizing agent is generally present in an amount greater than about 0.1% by weight, such as in an amount greater than about 0.5% by weight, such as in an amount greater than about 0.7% by weight.

In addition to the polyoxymethylene polymer and an acid neutralizing agent, the polymer composition further contains a plasticizer. The plasticizer can comprise a polyalkylene glycol, an ester, a polyester, an epoxide, a sulfonamide, a polyether, a polyimide, a polybutene, an acetylated monoglyceride, an alkyl citrate, an organophosphate, or mixtures thereof.

For instance, in one embodiment, the plasticizer comprises polyethylene glycol having a relatively high molecular weight. For example, the mean molecular weight of the plasticizer can generally be greater than about 8,000, such as greater than about 15,000, such as greater than about 20,000, such as greater than about 25,000, such as greater than about 30,000, such as greater than about 35,000. The mean molecular weight of the plasticizer is generally less than about 55,000, such as less than about 50,000, such as less than about 45,000, such as less than about 40,000.

In an alternative embodiment, the plasticizer may have ester functionality and may comprise a phthalate, an adipate, a sebacate, a maleate, a trimellitate, a benzoate, or mixtures thereof. Examples of suitable phthalates are diisobutyl phthalate (DIBP), dibutyl phthalate (DBP), diisoheptyl phthalate (DIHP), L 79 phthalate, L711 phthalate, dioctyl phthalate, diisooctyl phthalate, dinonyl phthalate, diisononyl phthalate, diisodecyl phthalate, L911 phthalate, diundecyl phthalate, diisoundecyl phthalate, undecyl dodecyl phthalate, diisotridecyl phthalate (DTDP) and butyl benzyl phthalate (BBP).

Examples of adipates are dioctyl adipate, diisononyl adipate and diisodecyl adipate. An example for a trimellitate is trioctyl trimellitate. Phosphate esters can also be used. Suitable examples are tri-2-ethylhexyl phosphate, 2-Ethylhexyl diphenyl phosphate and tricresyl phosphate.

Sebacates and azelates include di-29ethylhexyl sebacate (DOS) and di-2-ethylhexyl azelate (DOZ).

Polyester plasticizers are typically based on condensation products of propane- or butanediols with adipic acid or phthalic anhydride. The growing polymer chain of these polyesters may then be end-capped with an alcohol or a monobasic acid, although non-end-capped polyesters can be produced by strict control of the reaction stoichiometry.

Further plasticizers are benzoates which are commercially available as JAYFLEX® MB10, BENZOFLEX® 2088, BENZOFLEX® LA-705, and BENXOFLEX® 9-88. Epoxide based plasticizer include epoxidized vegetable oils.

In one embodiment, the plasticizer is an aromatic benzene sulfonamides. Preference is given to benzene sulfonamides represented by the general formula (I):

In which R1 represents a hydrogen atom, a $C_1$-$C_4$ alkyl group or a $C_1$-$C_4$ alkoxy group, X represents a linear or branched $C_2$-$C_{10}$ alkylene group, or an alkyl group, or a methylene group, or a cycloaliphatic group, or an aromatic group, and Y represents one of the groups H, OH or in which $R_2$ represents a $C_1$-$C_4$ alkyl group or an aromatic group, these groups optionally themselves being substituted by an OH or $C_1$-$C_4$ alkyl group.

The preferred aromatic benzenesulphonamides of formula (I) are those in which:
$R_1$ represents a hydrogen atom or a methyl or methoxy group, X represents a linear or branched $C_2$-$C_{10}$ alkylene group or a phenyl group, Y represents an H, OH or —O—CO—$R_2$ group, $R_2$ representing a methyl or phenyl group, the latter being themselves optionally substituted by an OH or methyl group.

Mention may be made, among the aromatic sulphonamides of formula (I) which are liquid (L) or solid (S) at room temperature as specified below, of the following products, with the abbreviations which have been assigned to them:
N-(2-hydroxyethyl)benzenesulphonamide (L),
N-(3-hydroxypropyl)benzenesulphonamide (L),
N-(2-hydroxyethyl)-p-toluenesulphonamide (S),
N-(4-hydroxyphenyl)benzenesulphonamide (S),
N-[(2-hydroxy-1-hydroxymethyl-1-methyl)ethyl]benzene-sulphonamide (L),
N-[5-hydroxy-1,5-dimethylhexyl]benzenesulphonamide (S),
N-(2-acetoxyethyl)benzenesulphonamide (S),
N-(5-hydroxypentyl)benzenesulphonamide (L),
N-[2-(4-hydroxybenzoyloxy)ethyl]benzene-sulphonamide (S),
N-[2-(4-methylbenzoyloxy)ethyl]benzenesulphonamide (S),
N-(2-hydroxyethyl)-p-methoxybenzenesulphonamide (S) and
N-(2-hydroxypropyl)benzenesulphonamide (L).

One particular plasticizer is a sulfonamide, for example N-(n-butyl)benzene sulfonamide.

It was unexpectedly discovered that controlling the ratio between the plasticizer and the acid neutralizing agent had a dramatic and unexpected effect on the ability of the polymer composition to be resistant to highly acidic solutions, such as solutions having a pH of less than about 3, such as less than about 2. For instance, the plasticizer can be present in relation to the acid neutralizing agent such that the plasticizer to acid neutralizing agent weight ratio is from about 3:1 to about 20:1. The weight ratio between the plasticizer and the acid neutralizing agent, for example, can be from about 3:1 to about 6:1, such as from about 3.5:1, to about 5.5:1, such as from about 3.8:1 to about 5.2:1.

As explained above, the actual amount of plasticizer present in the polymer composition can depend upon the amount of acid neutralizing agent present as well as various other factors. In general, the plasticizer is present in the composition in an amount greater than about 2% by weight, such as in an amount greater than about 3% by weight, such as in an amount greater than about 3.5% by weight, such as in an amount greater than about 3.8% by weight. The plasticizer is generally present in an amount less than about 12% by weight, such as in an amount less than about 8% by weight, such as in an amount less than about 6% by weight, such as in an amount less than about 5% by weight.

In addition to the polyoxymethylene polymer, the acid neutralizing agent, and the plasticizer, various other components and ingredients can be contained in the composition for improving one or more properties. For example, in one embodiment, the composition may contain a conductive filler so that any article molded from the composition exhibits electrostatic dissipative (ESD) capabilities. The conductive filler can include conductive particles, powders, fibers or combinations thereof. For instance, the conductive filler may comprise metal powders, metal flakes, metal fibers (i.e., stainless steel fibers), carbon powder, carbon fibers, carbon black, carbon nanotubes, or combinations thereof.

Further, the conductive filler can be present in the polymer composition of the present disclosure in an amount ranging from about 1% by weight to about 30% by weight, such as in an amount ranging from about 1.5% by weight to about 25% by weight, such as in an amount ranging from about 2% by weight to about 20% by weight, based on the total weight of the polymer composition.

In one embodiment, a formaldehyde scavenger, such as a nitrogen-containing compound, may be present. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Other particularly advantageous compounds are triamino-1,3,5-triazine (melamine) and its derivatives, such as melamine-formaldehyde condensates and methylol melamine. In one embodiment, the formaldehyde scavenger present in the composition comprises melamine. Oligomeric polyamides are also suitable in principle for use as formaldehyde scavengers.

In one embodiment, the formaldehyde scavenger present comprises a guanamine compound. The guanamine compound may include an aliphatic guanamine-based compound, an alicyclic guanamine-based compound, an aromatic guanamine-based compound, a heteroatom-containing guanamine-based compound, or the like. In one embodiment, the guanamine compound comprises benzoguanamine.

The polymer composition may contain a single formaldehyde scavenger or may contain a blend of formaldehyde scavengers. In general, the formaldehyde scavengers are present in the composition in an amount of at least about 0.01% by weight, such as in an amount of at least about 0.03% by weight, such as in an amount of at least about 0.05% by weight. The formaldehyde scavengers are generally present in an amount less than about 2% by weight, such as in an amount less than about 1.5% by weight, such as in an amount less than about 1% by weight, such as in an amount less than about 0.5% by weight, such as in an amount less than about 0.1% by weight.

In one embodiment, one or more formaldehyde scavengers may be combined with a copolyamide. The copolyamide may also enhance the ability of the composition to reduce formaldehyde emissions.

The copolyamide can have a softening point of generally greater than about 120° C., such as greater than about 130° C., such as greater than about 140° C., such as greater than about 150° C., such as greater than about 160° C., such as greater than about 170° C. The softening point of the copolyamide may be less than about 210° C., such as less than about 200° C., such as less than about 190° C., such as less than about 185° C. The copolyamide may have a melt viscosity at 230° C. of greater than about 7 Pa s, such as greater than about 8 Pa s, such as greater than about 9 Pa s. The melt viscosity is generally less than about 15 Pa s, such as less than about 14 Pa s, such as less than about 13 Pa s. In one embodiment, the copolyamide is ethanol soluble. In one embodiment, the copolyamide may comprise a polycondensation product of polymeric fatty acids with aliphatic diamines. The copolyamide can generally be present in the composition in an amount greater than about 0.01% by weight, such as in an amount greater than about 0.03% by weight, such as in an amount greater than about 0.05% by weight. The copolyamide is generally present in an amount less than about 2% by weight, such as in an amount less than about 1.5% by weight, such as in an amount less than about 1% by weight, such as in an amount less than about 0.5% by weight, such as in an amount less than about 0.1% by weight.

In one embodiment, an acid scavenger may be present. The acid scavenger may comprise, for instance, an alkaline earth metal salt. For instance, the acid scavenger may comprise a calcium salt, such as a calcium citrate or a calcium carbonate. In one embodiment, the acid scavenger may comprise tricalcium citrate. The acid scavenger may be present in an amount of at least about 0.01 wt. %, such as at least about 0.05 wt. %, such as at least about 0.09 wt. %. In one embodiment, greater amounts of an acid scavenger are used, such as when the acid scavenger is a carbonate. For example, the acid scavenger can be present in an amount greater than about 2 wt. %, such as greater than about 5 wt. %, such as greater than about 7 wt. %. The acid scavenger is generally present in an amount less than about 10 wt. %, such as less than about 7 wt. %, such as less than about 5 wt. %, such as less than about 1 wt. %, such as less than about 0.75 wt. %, such as less than about 0.5 wt. %, wherein the weight is based on the total weight of the respective polymer composition.

In one embodiment, a nucleant may be present. The nucleant may increase crystallinity and may comprise an oxymethylene terpolymer. In one particular embodiment, for instance, the nucleant may comprise a terpolymer of butanediol diglycidyl ether, ethylene oxide, and trioxane. In one embodiment, the terpolymer nucleant can have a relatively small particle size, such as having a d50 particle size of less than about 1 micron, such as less than about 0.8 microns, such as less than about 0.6 microns, such as less than about 0.4 microns, and generally greater than 0.01 microns. Other nucleants that may be used include a polyamide, boron nitride, or a talc. The polyamide nucleant may be PA6 or PA12. The nucleant may be present in the composition in an amount of at least about 0.01 wt,%, such as at least about 0.05 wt. %, such as at least about 0.1 wt. % and less than about 2 wt. %, such as less than about 1.5 wt. %, such as less than about 1 wt. %, wherein the weight is based on the total weight of the respective polymer composition.

In one embodiment, an antioxidant, such as a sterically hindered phenol, may be present. Examples which are available commercially, are pentaerythrityl tetrakis[3-(3,5-di-tart-butyl-4-hydroxyphenyl)propionate], triethylene glycol bis[3-(3-tert-butyl-4-hydroxy-5-methylphenyl)propionate], 3,3'-bis[3-(3,5-di-tert-butyl-4-hydroxyphenyl) propionohydrazide], and hexamethylene glycol bis[3-(3,5- di-tert-butyl-4-hydroxyphenyl)propionate]. The antioxidant may be present in the polymer composition in an amount of at least about 0.01 wt. %, such as at least about 0.05 wt. %, such as at least about 0.1 wt,%, such as at least about 0.2% by weight, and less than about 1 wt,%, such as less than about 0.75 wt. %, such as less than about 0.5 wt. %, wherein the weight is based on the total weight of the respective polymer composition.

In one embodiment, lubricants may be present. The lubricant may comprise a polymer wax composition. In one embodiment, a fatty acid amide such as ethylene bis(stearamide) may be present. In an alternative embodiment, the lubricant may comprise a polyalkylene glycol that has a relatively low molecular weight in relation to the plasticizer. For instance, the lubricant may comprise a polyethylene glycol that has a mean molecular weight of from about 1,000 to about 5,000, such as from about 3,000 to about 4,000. Lubricants may generally be present in the polymer composition in an amount of at least about 0.01 wt. %, such as at least about 0.05 wt. %, such as at least about 0.1 wt. % and less than about 1 wt. %, such as less than about 0.75 wt. %, such as less than about 0.5 wt. %, wherein the weight is based on the total weight of the respective polymer composition.

In one embodiment, a coloring agent may be present. Coloring agents that may be used include any desired inorganic pigments, such as titanium dioxide, ultramarine blue, cobalt blue, and other organic pigments and dyes, such as phthalocyanines, anthraquinnones, and the like. Other coloring agents include carbon black or various other polymer-soluble dyes. In one embodiment, a combination of coloring agents may be included in the polymer composition. For instance, the polymer composition may contain carbon black. In an alternative embodiment, the coloring agents present in the polymer composition may comprise titanium dioxide in combination with at least one color pigment, such as a yellow pigment and a green pigment and optionally further in combination with carbon black. The coloring agent may be present in the composition in an amount of at least about 0.01 wt. %, such as at least about 0.05 wt. %, such as at least about 0.1 wt. %, such as at least about 0.5 wt. %, and less than about 5 wt. %, such as less than about 2.5 wt. %, such as less than about 1 wt. %, wherein the weight is based on the total weight of the respective polymer composition.

When a coloring agent is present, one or more light stabilizers may also be contained within the composition. In one embodiment, lights stabilizers, such as sterically hindered amines, may be present in addition to the ultraviolet light stabilizer. Hindered amine light stabilizers that may be used include oligomeric hindered amine compounds that are N-methylated. For instance, hindered amine light stabilizer may comprise a high molecular weight hindered amine stabilizer. The light stabilizers, when present, may be present in the polymer composition in an amount of at least about 0.01 wt. %, such as at least about 0.05 wt,%, such as at least about 0,075 wt. % and less than about 1 wt. %, such as less than about 0.75 wt. %, such as less than about 0.5 wt. %, wherein the weight is based on the total weight of the respective polymer composition.

In one embodiment, an ultraviolet light stabilizer may be present. The ultraviolet light stabilizer may comprise a benzophenone, a benzotriazole, or a benzoate. The UV light absorber, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt,%, wherein the weight is based on the total weight of the respective polymer composition.

In one embodiment, however, the polymer composition is free of any light stabilizers. For instance, the composition may be free of an ultraviolet light stabilizer or a hindered amine light stabilizer.

The polymer composition may also optionally contain one or more reinforcing agents. For instance, the polymer composition may contain reinforcing fibers, such as glass fibers, carbon fibers, and the like. The reinforcing fibers can generally be present in an amount from about 2% to about 25% by weight.

In other embodiments, the polymer composition may contain reinforcing particles having a high aspect ratio. The particles may comprise, for instance, glass flakes, mica, loam, graphite, molybdenum disulfide, and mixtures thereof. The particles can have an aspect ratio of greater than about 1.5, such as greater than about 2, such as greater than about 2.5, such as greater than about 3, such as greater than about 3.5, such as greater than about 4, such as greater than about 4.5, such as greater than about 5 and generally less than about 20, such as less than about 15, such as less than about 12. The reinforcing fillers can be present in the composition generally in an amount from about 2% to about 25% by weight.

The compositions of the present disclosure can be compounded and formed into a polymer article using any technique known in the art. For instance, the respective composition can be intensively mixed to form a substantially homogeneous blend. The blend can be melt kneaded at an elevated temperature, such as a temperature that is higher than the melting point of the polymer utilized in the polymer composition but lower than the degradation temperature. Alternatively, the respective composition can be melted and mixed together in a conventional single or twin screw extruder. Preferably, the melt mixing is carried out at a temperature ranging from 100 to 280° C., such as from 120 to 260° C., such as from 140 to 240° C. or 180 to 220° C.

After extrusion, the compositions may be formed into pellets. The pellets can be molded into polymer articles by techniques known in the art such as injection molding, thermoforming, blow molding, rotational molding and the like.

In one embodiment, the polymer composition can be used to produce polymer articles designed for the automotive field. The polymer articles, for instance, may be designed to be an exterior vehicle part. In one embodiment, the molded articles are formed into a fuel contacting member. The fuel contacting member, for instance, may be one or more parts contained in the fuel system of a vehicle, such as a car or truck. The fuel contacting member, for instance, may be designed for repeated contact with diesel fuel.

Figure 1:
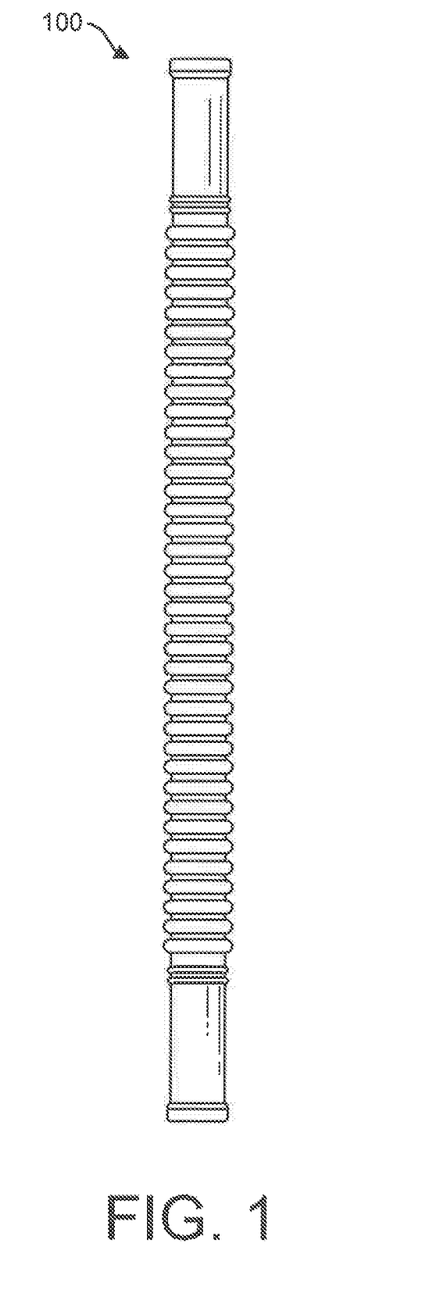
FIG. 1 is a side view of one embodiment of a fuel line made in accordance with the present disclosure.

Referring to FIG. 1, for instance, a fuel line 100 is shown formed from the polymer composition of the present disclosure. The fuel line 100, for instance, comprises, in this embodiment, a corrugated tube.

In addition to fuel lines, the polymer composition of the present disclosure can be used to produce fuel tanks, components of a fuel pump, components of a fuel filter, a fuel rail, components of an injector, a pressure regulator, and a return fuel line.

Figure 2:
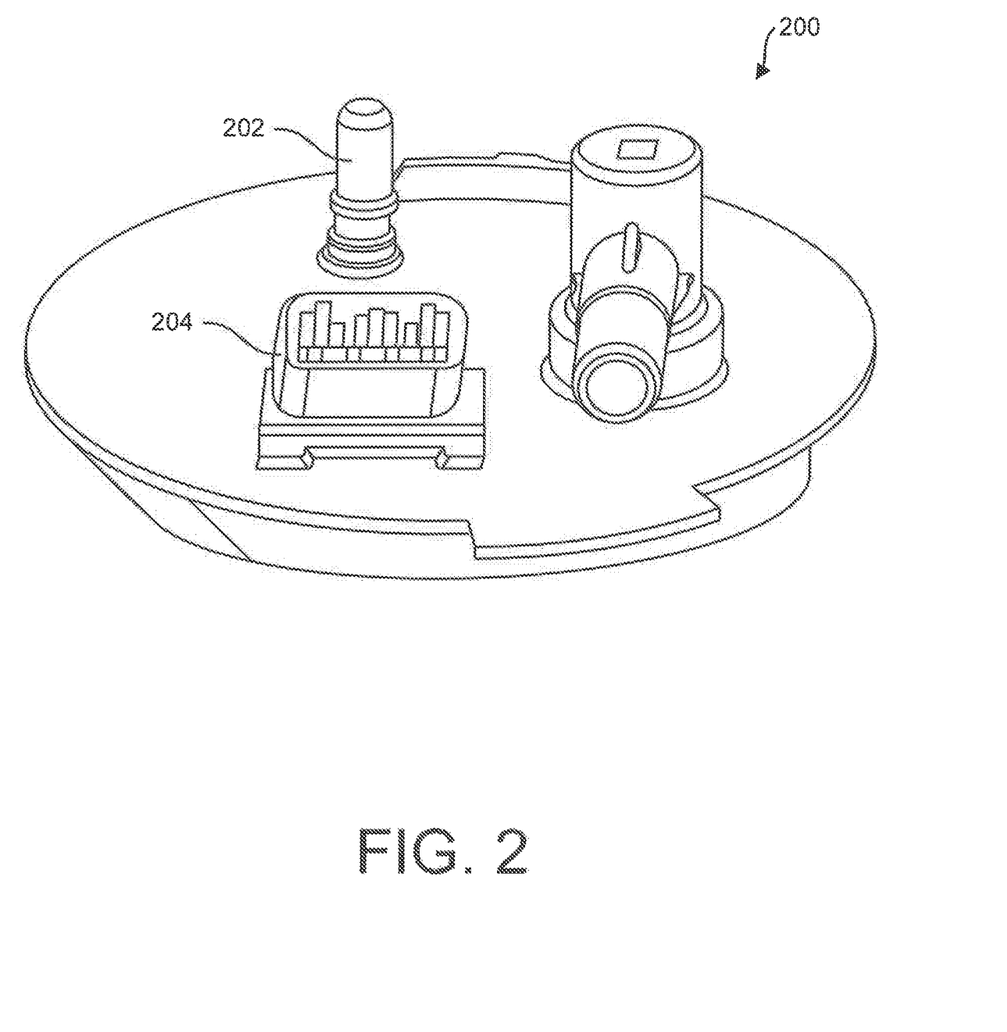
FIG. 2 is a perspective view of one embodiment of a fuel flange made in accordance with the present disclosure.

In one embodiment, the polymer composition is used to produce a fuel flange 200 as shown in FIG. 2. The fuel flange 200, for instance, is designed to be placed on a fuel tank and connected to one or more fuel lines. For example, as shown in FIG. 2, the fuel flange 200 can include at least one fuel inlet or outlet 202 for feeding fuel to a fuel tank and for dispensing fuel from the fuel tank. The fuel flange 200 can also include an electrical connector 204 for connecting a controller contained within the vehicle to various sensors that may be present in and around the fuel tank.

The present disclosure may be better understood with reference to the following example.

EXAMPLES

The following examples are provided to further illustrate the invention but not to limit its scope. Other variants of the invention will be readily apparent to one of ordinary skill in the art and are encompassed by the appended claims.

Example 1

In this example, various polymer compositions were formulated and tested for resistance against a highly acidic solution. The highly acidic solution used was a wheel cleaner solution.

The following polymer compositions were formulated:

| Components | Formulation (%) | | |
|---|---|---|---|
| | Sample 1 | Sample 2 | Sample 3 |
| Polyoxymethylene copolymer (MFI = 13 g/10 min) | 95.7 | 96.05 | 94.05 |
| Nucleating agent - polyoxymethylene terpolymer | 0.5 | 0.25 | 0.25 |
| Phenolic antioxidant | 0.3 | 0.30 | 0.30 |
| Ethylene bis(stearamide) | 0.2 | 0.20 | 0.20 |
| Tricalcium citrate | 0.1 | 0.10 | 0.10 |
| Copolyamide | 0.05 | 0.05 | 0.05 |
| Melamine | 0.05 | 0.05 | 0.05 |
| Polyethylene glycol (MW = 35,000) | 2 | 2 | 4 |
| Zinc oxide particles | 1 | 1 | 1 |
| Coloring agent (yellow) | 0.1 | 0 | 0 |

The above polymer compositions were molded into test plaques and tested against a wheel cleaner solution. The wheel cleaner solution used was EAGLE ONE Chrome Wheel Cleaner marketed by Eagle One of Draper, Utah. The wheel cleaner had a pH of 1.3 and contained the following acidic ingredients:

| Components | CAS number | Concentration |
|---|---|---|
| Phosphoric Acid | 7664-38-2 | >=5-<10% |
| Sodium 1-Octanesulfonate | 5324-84-5 | >=1.5-<5% |
| Ethanedioic Acid, Dihydrate | 6153-56-6 | >=1.5-<5% |
| Sulfuric Acid | 7664-93-9 | >=0.5-<1% |
| Hydrofluoric Acid | 7664-39-3 | >=0.1-<=0.9% |

The test was performed by spraying the solution over a strained molded part. The strain 2% was achieved by applying 77.8 mm radius curvature to a 3 mm thickness part. The solution was sprayed four times a day and the part was monitored hourly for the first day, twice a day for Day 2-7, and once a day afterward. The general procedure and the guideline for visual inspection was as follows:

Procedure
1. Each sample is covered in a layer of gauze and placed on the bending fixture. The gauze is there to ensure uniform coverage on the surface. Leave gauze on the surface during aging.
2. The samples are subjected to 2% strain. (There should not be a large difference between materials at a strain of 2%).
3. The stressed samples are sprayed with Eagle One Chrome wheel cleaner 4 times every day. Suggested times: 8 am, 11 am, 2 pm, and 5 pm.
4. Samples should be given one even spray unless a second spray is required for uniform and consistent coverage.
a. Please measure pH periodically though the first few days to confirm consistent exposure
5. Remove gauze and document evidence of cracking with the following schedule
a. Day 1 (once per hour until end of day)
b. Day 2-7 (twice per day beginning and end of shift during working days)
c. Day 8 through 25 (once per day during working days only)
6. This process is continued for a period of 25 days.

Visual Inspection
1. Day 1—Samples should be inspected every hour between 8 am and 5.
2. Day 2-5—samples should be inspected 3 times a day during normal working days only. Suggested times: 8 am, 1 pm, and 5 pm.
3. Days 6-25 samples should be inspected once per day during normal working days only.
4. All observations are recorded as follows: ○ means that the sample is OK, Δ means the sample has a small surface crack, X means there's a 12 mm long crack, and XX means the sample is cracked all the way through.
5. Photo documentation should be taken of any crack or deterioration of surface within the 25 day time period.

Figure 3:
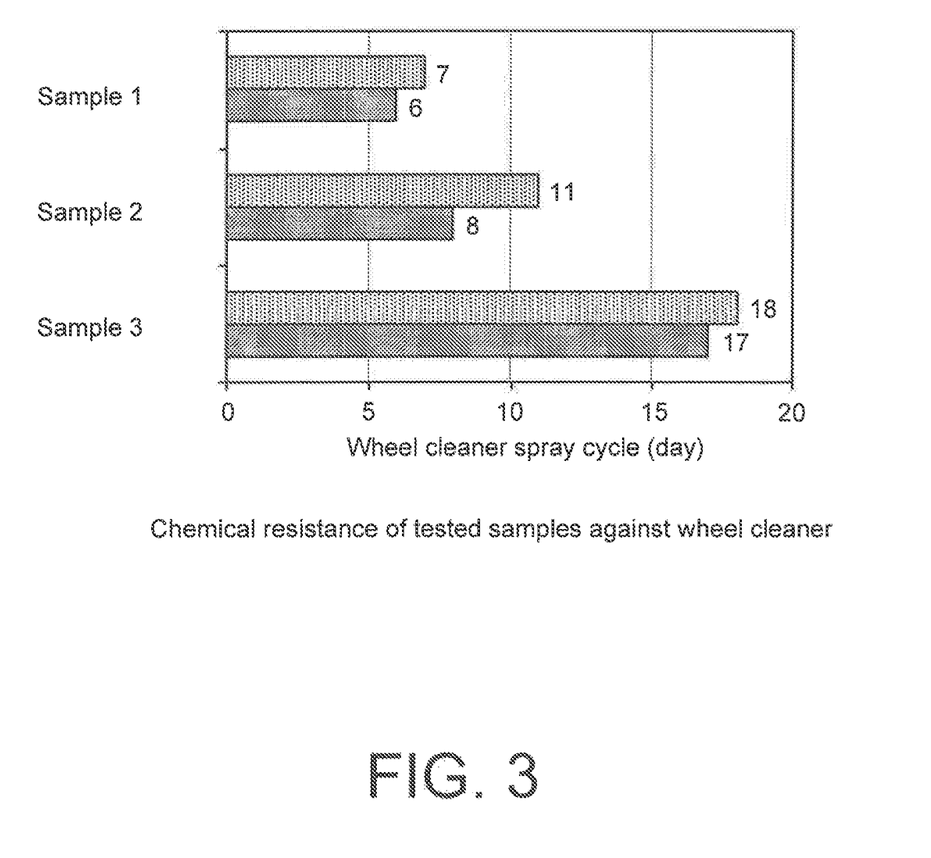
FIG. 3 is a graphical representation of results obtained in the examples below.

The results are illustrated in FIG. 3.

As shown, Sample 3 dramatically outperformed Samples 1 and 2 in the wheel cleaner resistance test. Sample 3 contained a plasticizer to acid neutralizing agent weight ratio of 4:1.

The different polymer compositions were also tested for various physical properties. The following results were obtained:

| Sample No. | Tensile Modulus (MPa) ISO 527-2/1A | Tensile Stress (MPa) ISO 527-2/1A | Tensile Strain (%) ISO 527-2/1A | MFI (g/10 min) ISO 1133 |
|---|---|---|---|---|
| 1 | 2840 | 61 | 11 | 14.6 |
| 2 | 2717 | 59 | 12 | 14.8 |
| 3 | 2553 | 54 | 14 | 15.5 |

Example 2

A polymer composition was formulated in accordance with the present disclosure and tested for various physical properties. Sample #4 of the polymer composition contained the following components:

| Component | Formulation (%) of Sample 4 |
|---|---|
| Polyoxymethylene copolymer (MFI = 13 g/10 min) | 94.05 |
| Nucleating agent - polyoxymethylene terpolymer | 0.25 |
| Phenolic antioxidant | 0.30 |
| Ethylene bis(stearamide) | 0.20 |
| Tricalcium citrate | 0.10 |
| Copolyamide | 0.05 |
| Melamine | 0.05 |
| Polyethylene glycol (MW = 35,000) | 4 |
| Zinc oxide particles | 1 |

The above polymer composition was molded into various test plaques and the following results were obtained:

| | | |
|---|---|---|
| Physical Properties | Melt Volume Rate (MVR) (cm$^3$/10 min) ISO 1133 | 13 |
| | MVR Test Temperature (° C.) ISO 1133 | 190 |
| | MVR Test Load (kg) ISO 1133 | 2.16 |
| Mechanical Properties | Tensile Modulus (1 mm/min) (MPa) ISO 527-2/1A | 2500 |
| | Tensile Stress at yield (50 mm/min) (MPa) ISO 527-2/1A | 53 |
| | Tensile Stress at yield (50 mm/min) (%) ISO 527-2/1A | 15 |
| | Flexural Modulus, 23° C. (MPa) ISO 178 | 2300 |
| | Charpy Notched Impact Strength, 23° C. (kJ/m$^2$) ISO 179/1eA | 6.0 |
| | Retention of Tensile Stress at Yield After Long Term Heat Aging (50 mm/min) 120° C., 1000 hrs (%) Internal Method, ISO 527-2/1A | 112 |
| Thermal Properties | Melting Temperature (10° C./min) (° C.) ISO 11357-1, -2, -3 | 170 |
| | DTUL at 1.8 MPa (° C.) ISO 75-1, -2 | 90 |
| Fuel Performances | Fuel Permeation, CE10 at 40° C. (g-mm/day-m$^2$) SAE J2665 | 4.0 |
| | Retention of tensile stress at yield after fuel exposure (50 mm/min) Fuel CM 15A at 63° C., 5000 hrs (%) ISO 527-2/1 A | 91 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer composition comprising:
    a polyoxymethylene polymer present in the polymer composition in an amount of at least 60% by weight;
    an acid neutralizing agent, the acid neutralizing agent being present in the polymer composition in an amount from 3% to 10% by weight, wherein the acid neutralizing agent comprises magnesium oxide or a mixture of magnesium oxide and zinc oxide, the acid neutralizing agent having a BET surface area of greater than 25 m$^2$/g;
    a plasticizer, wherein the plasticizer comprises a polyalkylene glycol, the polyalkylene glycol being present in the polymer composition in an amount from 2% to 12% by weight; and
    wherein the composition further contains an ethylene bis(stearamide) and a copolyamide.

2. A polymer composition comprising:
    a polyoxymethylene polymer present in the polymer composition in an amount of at least 60% by weight;
    an acid neutralizing agent, the acid neutralizing agent being present in the polymer composition in an amount from 3% to 10% by weight, the acid neutralizing agent comprising magnesium oxide or a mixture of magnesium oxide and zinc oxide; and
    a plasticizer, the plasticizer comprising polyethylene glycol,
    the composition further containing a nucleating agent, an antioxidant, an ethylene bis(stearamide), tricalcium citrate, a copolyamide, and melamine.

* * * * *